US008017543B2

(12) United States Patent
Andy et al.

(10) Patent No.: US 8,017,543 B2
(45) Date of Patent: Sep. 13, 2011

(54) METHOD FOR OBTAINING A HOMOGENEOUS FILTERING STRUCTURE FOR A CATALYTIC APPLICATION

(75) Inventors: Patricia Andy, Les Taillades (FR); Sebastien Bardon, Paris (FR); Vincent Marc Gleize, Avignon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 519 days.

(21) Appl. No.: 12/088,168

(22) PCT Filed: Sep. 29, 2006

(86) PCT No.: PCT/FR2006/050963
§ 371 (c)(1),
(2), (4) Date: Sep. 26, 2008

(87) PCT Pub. No.: WO2007/039698

PCT Pub. Date: Apr. 12, 2007

(65) Prior Publication Data
US 2009/0054227 A1     Feb. 26, 2009

(30) Foreign Application Priority Data

Sep. 30, 2005    (FR) ..................................... 05 52979

(51) Int. Cl.
*B01J 27/224*    (2006.01)
*C04B 35/52*    (2006.01)
*C04B 35/56*    (2006.01)
*B32B 3/12*    (2006.01)
(52) U.S. Cl. ........................... 502/178; 501/88; 428/116
(58) Field of Classification Search .................. 502/178; 501/88; 428/116
See application file for complete search history.

(56) References Cited

U.S. PATENT DOCUMENTS

| 7,037,477 | B2 * | 5/2006 | Tomita et al. ................. 423/345 |
| 7,253,134 | B2 * | 8/2007 | Furukawa et al. ............. 502/178 |
| 7,473,464 | B2 * | 1/2009 | Morimoto et al. ......... 428/305.5 |
| 7,648,932 | B2 * | 1/2010 | Weisensel et al. .............. 501/88 |
| 2004/0033175 | A1 | 2/2004 | Ohno et al. |
| 2004/0033893 | A1 * | 2/2004 | Tomita et al. ................. 502/178 |
| 2004/0187561 | A1 | 9/2004 | Ichikawa |
| 2005/0169818 | A1 | 8/2005 | Ohno et al. |
| 2006/0043652 | A1 | 3/2006 | Saijo et al. |

FOREIGN PATENT DOCUMENTS

| EP | 1 338 322 | 8/2003 |
| EP | 1 462 171 | 9/2004 |
| EP | 1 491 249 | 12/2004 |
| EP | 1 647 790 | 4/2006 |
| WO | 94 21900 | 9/1994 |
| WO | 03/082771 | * 10/2009 |

* cited by examiner

*Primary Examiner* — Patricia L Hailey
(74) *Attorney, Agent, or Firm* — Oblon, Spivak, McClelland, Maier & Neustadt, L.L.P.

(57) ABSTRACT

The invention relates to a method of obtaining a homogeneous filtering structure for a catalytic application, which can be used as a particulate filter in an internal combustion engine exhaust line, said structure comprising a plurality of honeycomb filter elements in which a homogeneity criterion characteristic of the constituent support material of said elements, in the absence of a catalytic coating, is determined in a prior step, and then the elements making up the structure are selected by means of this homogeneity criterion so as to obtain a structure suitable for homogeneous deposition, within an element and from one element to another, of a catalyst for treating the pollutants in gas phase.

The invention also relates to the homogeneous filtration structure obtained by said method.

21 Claims, No Drawings

METHOD FOR OBTAINING A HOMOGENEOUS FILTERING STRUCTURE FOR A CATALYTIC APPLICATION

The invention relates to the field of particulate filters, especially those used in an engine exhaust line for eliminating the soot produced by the combustion of a diesel fuel in an internal combustion engine. More precisely, the invention relates to a method of obtaining a filtering structure that can be used as a particulate filter, said structure being particularly suitable for homogeneously depositing a material that also gives it catalytic properties.

Structures for filtering the soot particles contained in internal combustion engine exhaust gases are well known in the prior art. These structures usually have a honeycomb structure, one of the faces of the structure allowing entry of the exhaust gases to be filtered and the other face for exit of the filtered exhaust gases. This structure comprises, between the entry and exit faces, a number of adjacent ducts or channels of mutually parallel axes separated by porous filtration walls, which ducts are closed off at one or other of their ends so as to define inlet chambers opening onto the entry face and outlet chambers opening onto the exit face. To achieve good sealing, the peripheral part of the structure is surrounded by a coating cement. These channels are alternately closed off in an order such that the exhaust gases, on passing through the honeycomb body, are forced to pass through the sidewalls of the inlet channels in order to rejoin the outlet channels. In this way, the particulates or soot particles are deposited on the porous walls of the filter body and accumulate thereon. Usually, the filter bodies are made of a porous ceramic, for example from cordierite or silicon carbide.

During its use, the particulate filter is subjected, in a known manner, to a succession of filtration (soot accumulation) phases and regeneration (soot elimination) phases. During the filtration phases, the soot particles emitted by the engine are retained and deposited inside the filter. During the regeneration phases, the soot particles are burnt off inside the filter, so as to restore its filtration properties. The porous structure is therefore subjected to intense thermal and mechanical stresses which may result in microcracks liable, over time, to result in the unit suffering a severe loss of filtration capability, or even in its complete deactivation. This phenomenon is observed in particular on large-diameter monolithic filters.

To solve these problems and increase the lifetime of the filters, it has been proposed more recently to make more complex filtration structures by combining, into a filter block, several monolithic honeycomb elements. The elements are usually joined together by bonding them using a cement of ceramic nature, called joint cement in the rest of the description. Examples of such filtering structures are for example described in the patent applications EP 816 065, EP 1 142 619, EP 1 455 923 or WO 2004/090294.

The filters or porous soot filtration structures as described above are mainly used on a large scale in pollution control devices for the exhaust gases of a diesel engine.

In addition to the soot treatment problem, the conversion of the polluting gaseous emissions (i.e. mainly nitrogen oxide ($NO_x$) or sulfur oxide ($SO_x$) and carbon monoxide (CO), or even unburnt hydrocarbons) into less harmful gases (such as gaseous nitrogen ($N_2$) or carbon dioxide ($CO_2$)) requires an additional catalytic treatment.

To eliminate these gaseous pollutants, current particulate filters further include a catalytic coating deposited at least on the surface of the channels and usually in the pores of the walls. Depending on the processes conventionally used, the raw honeycomb structure is impregnated with a solution comprising the catalyst or a precursor of the catalyst.

Such processes may typically include an impregnation step by immersion either in a solution containing a catalyst precursor or the catalyst dissolved in water (or another polar solvent) or in a suspension of catalytic particles in water. One example of such a process is described by the patent U.S. Pat. No. 5,866,210. According to this process, by applying a vacuum to the other end of the filter it is possible thereafter for the solution to rise up into the structure and consequently coat the internal walls of the honeycomb structure. Alternatively, but more rarely, the impregnation step may be carried out using a solution containing a nonpolar solvent, such as an oil or a hydrocarbon, or surfactants.

According to other ways of implementing the honeycomb filter impregnation process, said impregnations may be obtained by pumping, by applying a vacuum or by pressurizing the liquid containing the impregnation solution, at least at one end of the monolith. Usually the processes described are characterized by a combination of these various techniques, over the course of successive steps, the final step making it possible, by introducing pressurized air or by suction, to remove the excess solution and/or obtain better dispersion of the catalyst within the filter. One of the essential aims sought by implementing these processes is to obtain a uniform catalyst coating on, or even inside, at least part of the porous walls of the channels making up the internal part of the structure and through which the exhaust gases pass.

Such processes, together with the devices for implementing them, are for example described in the patent applications or patents US 2003/044520, WO 2004/091786, U.S. Pat. Nos. 6,149,973, 6,627,257, 6,478,874, 5,866,210, 4,609,563, 4,550,034, 6,599,570, 4,208,454 or U.S. Pat. No. 5,422,138.

One of the main problems arising during this impregnation step for an assembled structure as described above is how to determine the precise necessary amount of catalyst or catalyst precursor that has to be deposited on the surface and usually in the pores of the walls of each constituent element of the filter. This amount must neither be too low, in which case the effectiveness of the polluting gas treatment is appreciably impaired, nor too high so as to avoid too great an increase in the pressure drop occasioned in the exhaust line by the filter and a substantial additional cost owing to the use of an excess amount of catalyst based on precious metals. For maximum filter effectiveness, it is also imperative that the distribution of the catalyst on the filter be as homogeneous as possible within an element, but also from one element to another in the assembly.

Furthermore, an inhomogeneous distribution of the catalyst coating results in reduced effectiveness of the catalytic gas treatment but also, in the regions of the filter where the catalyst concentration is lower, in a delay in initializing the soot combustion reaction. It has now been discovered that the soot particles accumulate in these regions and that their presence results, when filter operation is characterized by successive regenerations, in high thermomechanical stresses throughout the volume of the filter thereby reducing its performance and its lifetime.

The patent application EP 1 462 171 thus describes a process intended for measuring the precise amount of catalyst that can be deposited on a honeycomb structure, the process including, for each element, an initial step of determining a water adsorption value, said value then being printed, for example by means of a marker, on said element in such a way that it can be read subsequently and used as reference for adjusting the precise amount of catalyst to be incorporated into this element.

However, such a process requires the means for depositing the catalytic coating to be continually adapted and recalibrated according to the water absorption value read specific to each element. This results in greater complexity, additional cost and longer duration of the deposition process.

Thus, there is an unmet need for an easier method of obtaining a homogeneous filtration structure, that is to say capable of homogenous catalyst deposition, in which it will be possible to deposit, rapidly and without additional handling, an optimum homogeneous catalytic coating within an element, from one element to another in the structure, and even over an entire population of said structure. Such a method forms the subject of the present invention.

More precisely, the present invention relates to a method of obtaining a homogeneous filtering structure for a catalytic application, which can be used as a particulate filter in an internal combustion engine exhaust line, said structure comprising a plurality of honeycomb filter elements and being characterized in that:

a) a homogeneity criterion characteristic of the constituent support material of said elements, in the absence of a catalytic coating, is determined in a prior step; and b) the elements that may make up the structure are selected by means of this homogeneity criterion so as to obtain a suitable structure with a homogeneous coating, within an element and from one element to another, of a catalyst for treating gaseous pollutants.

More precisely, the invention relates to a method of obtaining a homogeneous filtering structure for a catalytic application, which can be used as a particulate filter in an internal combustion engine exhaust line, said structure comprising a plurality of honeycomb filter elements and being characterized in that:

a) a homogeneity criterion characteristic of the constituent support material of said elements, in the absence of a catalytic coating, is determined in a prior step, said criterion being chosen from the group formed by the average water absorption value, the mid-height width of the pore distribution peak and the pressure for unclogging the pores of the material after immersion in a liquid such as water;

b) the elements making up said structure are selected and sorted by means of this homogeneity criterion; and c) said elements meeting said homogeneity criterion are assembled so as to obtain a structure suitable for homogeneous deposition, within an element and from one element to another, of a catalyst for treating the pollutants in gas phase.

The method may further include a step d) in which said catalyst is deposited in an appropriate amount before or after the assembly step, in order in the end to obtain a homogeneous catalytic filter.

By applying such a homogeneity criterion it is possible according to the invention to guarantee that the catalytic coating is homogenous within a population of filters, by appropriately selecting the elements making up the said filters.

Preferably, the support material is based on an SiC carbide, that is to say it comprises at least 30%, preferably at least 70% and even more preferably at least 98% SiC by weight.

According to a first possible way of implementing the present method, the homogeneity criterion is measured relative to a variance or a standard deviation measured using a mean water adsorption value characteristic of a population of elements.

According to a second possible way of implementing the present method, the homogeneity criterion is the mid-height width of the pore distribution peak measured by mercury porosimetry.

According to a third possible way of implementing the present method, the homogeneity criterion is the pressure for unclogging the pores by a fluid after the element has been immersed in a liquid. For example, according to this third method of implementation, the homogeneity criterion may be the pressure for unclogging the pores, measured on a test specimen pre-impregnated with water by immersion. The method typically consists in immersing the unitary element for at least 30 minutes in a liquid, for example and preferably water. After removing the water in the channels, by gently shaking the part and after wiping off, if required, the excess water on the surface with a rag, the unitary element is placed in a pressure drop rig well known to those skilled in the art. This device consists in injecting a gas, preferably air, or alternatively a fluid having no chemical interaction with the impregnation liquid, so as to expel the liquid imbibed by the pores of the constituent material of the unitary element. The fluid must pass into the section of the unitary element and through the wall of each inlet channel so as to emerge via the adjacent outlet channel. This device includes a pressure sensor upstream downstream of the unitary element so as to measure the differential pressure for various inlet gas flow rates. The flow rate and differential pressure measurements are typically carried out at room temperature, however, without departing from the scope of the invention, hot measurements are also possible provided that the test temperature is sufficiently below the temperature at which the impregnation liquid vaporizes. The flow rate used in the case of air injection are typically a few $m^3/h$, for example between 1 and 20 $m^3/h$. The unclogging pressure may therefore be measured for example from the pressure/flow rate curve. The unclogging pressure is the pressure at which a first plateau is observed, during which the differential pressure remains virtually constant despite the increase in flow rate. On a filter element based on porous recrystallized SiC material, depending on the porosity and the sintering conditions, this unclogging pressure is typically from a few tens of millibars to several hundred millibars (1 bar=0.1 MPa) for a flow rate range typically lying from 1 to 20 $m^3/h$ approximately.

Usually, the homogeneity criterion is determined as a function of a porosity range and preferably by reference to a median diameter range of the pores.

The method as described above applies in particular when the porosity of the support material is between 44% and 50% and its median pore diameter is between 10 μm and 18 μm, such as for example a material based on recrystallized silicon carbide.

In this case, the selected elements have for example a standard deviation of less than 2%, preferably less than 1%, relative to a water adsorption value measured beforehand.

According to a possible variant, the selected elements have a porosity peak mid-height width measured by mercury porosimetry of less than 5 μm.

More generally, the present method may in particular be used for the manufacture of a homogeneous filtering structure for a catalytic application or for the manufacture of a catalytic filter, the support material of which has a porosity between 30% and 70% and/or a median pore diameter of between 6 μm and 30 μm.

The present invention also relates to the homogeneous filtering structure for a catalytic application and to a catalytic filter that can be obtained using the method described above.

The invention will be better understood on reading the following examples of the invention, which are not limiting under any of the aspects described and are only provided for better understanding the invention.

EXAMPLE 1

Comparative Example

A first population of 100 monolithic silicon carbide honeycomb elements were synthesized using the techniques of the prior art, for example those described in the patents EP 816 065, EP 1 142 619, EP 1 455 923 or WO 2004/090294. To do this, the following were mixed in a mixer:

3000 g of a mixture of silicon carbide particles with a purity of greater than 98% and having a particle size such that 70% by weight of the particles have a diameter greater than 10 microns, the median diameter of this particle size fraction being less than 300 microns (within the context of the present description, the median diameter denotes the diameter of the particles below which 50% by weight of the population lies); and 150 g of an organic binder of the cellulose derivative type.

Water was added and mixing was continued for the formation of a homogeneous paste, the plasticity of which allowed it to be extruded through a die so as to obtain a honeycomb structure, the dimensional characteristics of which are given in Table 1:

TABLE 1

| | |
|---|---|
| Geometry of the channels and of the monolith | Square |
| Channel density | 180 cpsi (channels per square inch: 1 inch = 2.54 cm) |
| Wall thickness | 350 μm |
| Length | 17.4 cm |
| Width | 3.6 cm |
| Weight | 1800 g |
| Porosity | Between 44% and 50% |
| Median pore diameter | Between 10μ and 18 μm |

Next, the green monoliths obtained were dried by microwave heating for a time sufficient to bring the chemically unbound water content to less than 1% by weight.
The channels of each face of the monolith were blocked alternately using well-known techniques, for example those described in the application WO 2004/065088.
The monoliths were then fired at a temperature of at least 2100° C., this temperature being maintained for 5 hours.

An individual water absorption measurement was carried out on the set of monolithic elements thus produced, according to the teachings of the application EP 1 462 171. The standard deviation obtained relative to the water absorption mean was close to 4%.

Next, 16 monolithic elements were selected at random from this first population.

High-pressure mercury porosimetry analyses were carried out on the other elements, by means of a porosimeter of the Micromeritics 95000 type. These measurements show that the porosity of the elements varied between 44% and 50% and the median pore diameter varied between 10 μm and 18 μm. The pore size distribution was of the unimodal type for all the elements, independently of their porosity or their median pore diameter. The mean of mid-height width of the mercury porosity peak obtained on all these elements was 6.1 μm.

The 16 randomly selected elements were joined together so as to obtain a filtering structure assembled using the well-known methods described in the abovementioned applications.

The assembled structure obtained was then immersed in a bath of an aqueous solution containing the appropriate proportions of a platinum precursor in $H_2PtCl_6$ form and of a precursor of cerium oxide $CeO_2$ (in cerium nitrate form) and of a precursor of zirconium oxide $ZrO_2$ (in zirconyl nitrate form) using the principles described in the publication EP 1 338 322 A1. The filter was impregnated with the solution using a method of implementation similar to that described in the patent U.S. Pat. No. 5,866,210. The filter was then dried at about 150° C. then heated at a temperature of about 600° C.

The catalytic filter thus obtained underwent a regeneration on an engine test bed after said filter had been charged with a limiting mass of soot of 7 g/liter. The regeneration conditions were the following: after the engine stabilized to a speed of 1700 rpm for a torque of 95 Nm for 2 minutes, a hydrocarbon post-injection was carried out for 10 minutes.

The fresh filter weighed 1800 g, weighed 1828 g after charging with soot and weighed 1805 g after regeneration.

The filter was recovered and cut into slices. It was observed that the unburnt soot was located more particularly in certain unitary parts (elements) of the filter.

Of the 28 g of soot deposited in the filter, only 23 g had burnt of. Without being tied to any theory, it is very probable that, owing to the small amount of catalyst present in certain regions of the filter (i.e. those in which soot was observed), the hydrocarbons injected for the regeneration were not all able to be oxidized in the presence of the catalyst. In these regions, the exothermic reaction did not allow the minimum temperature needed to burn off the soot (550° C.) to be reached. The filter obtained according to this example, which was not homogeneous, therefore gradually accumulated soot in certain regions during normal operation on the vehicle, thereby resulting in very severe and impromptu regenerations, with a large exotherm and the formation of cracks causing it to become progressively inactivated or even a not insignificant risk of the filter being destroyed.

EXAMPLE 2

A second population of 100 monolithic elements was synthesized in a second step, under the same conditions as in Example 1.

A water absorption measurement was carried out individually on the set of monolithic elements making up this second population, according to the teachings of the application EP 1 462 171, with a result identical to that of Example 1.

Next, two series of 16 monolithic elements were selected from this second population in such a way that the standard deviation obtained relative to the mean water absorption was less than 1% for these 32 elements.

The high-pressure mercury porosimetry analyses carried out on the remaining elements showed, as in the case of Example 1, a mean porosity for each element between 44% and 50% for a mean pore diameter between 10 μm and 18 μm, and with a pore size distribution of unimodal type.

The 16 elements making up the first series were assembled as previously, so as to obtain an assembled filtering structure the structural characteristics of which were identical to those described in Table 1.
The structure was then impregnated with catalyst using an operating method identical to that of Example 1.

The filter was regenerated on the engine test bed with a limiting mass of soot of 7 g/l according to an experimental protocol identical to that of Example 1. The fresh filter weighed 1800 g, weighed 1828 g after charging with soot and weighed 1801 g after regeneration.

The regenerated filter was recovered and cut into slices. This time, no soot was observed in the unitary parts of the filter. The filter was satisfactory from the homogeneity standpoint.

The mean of the mid-height width of the porosity peak obtained on the second series of 16 elements selected was 3.7 µm.

The invention claimed is:

1. A method of obtaining a homogeneous filtering structure comprising a plurality of honeycomb filter elements comprising:
 a) selecting a subpopulation of honeycomb filter elements prior to deposition of a catalyst on the filter element that have similar characteristics as determined by at least one criterion selected from the group consisting of average water absorption value, mid-height width of the pore distribution peak, and pressure for unclogging the pores of the material after immersion in a liquid;
 b) depositing homogeneously a catalyst on the selected subpopulation of filter elements, and
 c) assembling a homogenous filtering structure from said filter elements before or after homogeneous application of the catalyst.

2. The method of claim 1, wherein the catalyst is deposited on the filter elements before assembly of these elements into a homogeneous filtering structure.

3. The method of claim 1, wherein the catalyst is deposited on the filter elements after assembly of these elements into a homogeneous filtering structure.

4. The method of claim 1 wherein the honeycomb filter elements comprise a support material containing at least 30% SiC (silicon carbide) by weight.

5. The method of claim 1, wherein the honeycomb filter elements comprise a support material containing at least 70% SiC (silicon carbide) by weight.

6. The method of claim 1, wherein the honeycomb filter elements comprise a support material containing at least 98% SiC (silicon carbide) by weight.

7. The method of claim 1, wherein said honeycomb filter elements comprise a support structure having a porosity between 30% and 70% and/or a median pore diameter between 6 µm and 30 µm.

8. The method of claim 1, wherein said honeycomb filter elements comprise a support structure having a porosity between 44% and 50% and median pore diameter is selected to range between 10 µm and 18 µm.

9. The method of claim 1, wherein the selection criterion comprises average water absorption value.

10. The method of claim 9, in which the homogeneity criterion is measured relative to a variance or a standard deviation measured using a mean water adsorption value characteristic said honeycomb filter elements.

11. The method of claim 9, in which the selected subpopulation of honeycomb filter elements have a standard deviation of less than 2% in their average water absorption values.

12. The method of claim 1, wherein the selection criterion comprises mid-height width of the pore distribution peak.

13. The method of claim 12, in which the homogeneity criterion is the mid-height width of the pore distribution peak measured by mercury porosimetry.

14. The method as claimed in claim 12, in which the selected elements have a porosity peak mid-height width measured by mercury porosimetry of less than 5 µm.

15. The method of claim 1, in which the homogeneity criterion is determined as a function of a porosity range.

16. The method of claim 1, in which the homogeneity criterion is determined as a function of a porosity range based on the median diameter range of the pores.

17. The method of claim 1, wherein the selection criterion comprises pressure for unclogging the pores of the material after immersion in a liquid.

18. The method of claim 17, wherein said liquid is water.

19. The method of claim 1, wherein said catalyst removes nitrogen oxide, sulfur oxides, carbon monoxide, or unburnt hydrocarbons from a gas phase.

20. A homogeneous filtering structure for a catalytic application, which is obtained using the method according to claim 1.

21. A catalytic filter that is obtained using the method according to claim 1.

* * * * *